July 23, 1929.    C. B. HARDMAN    1,721,906
BALING PRESS
Original Filed April 24, 1926
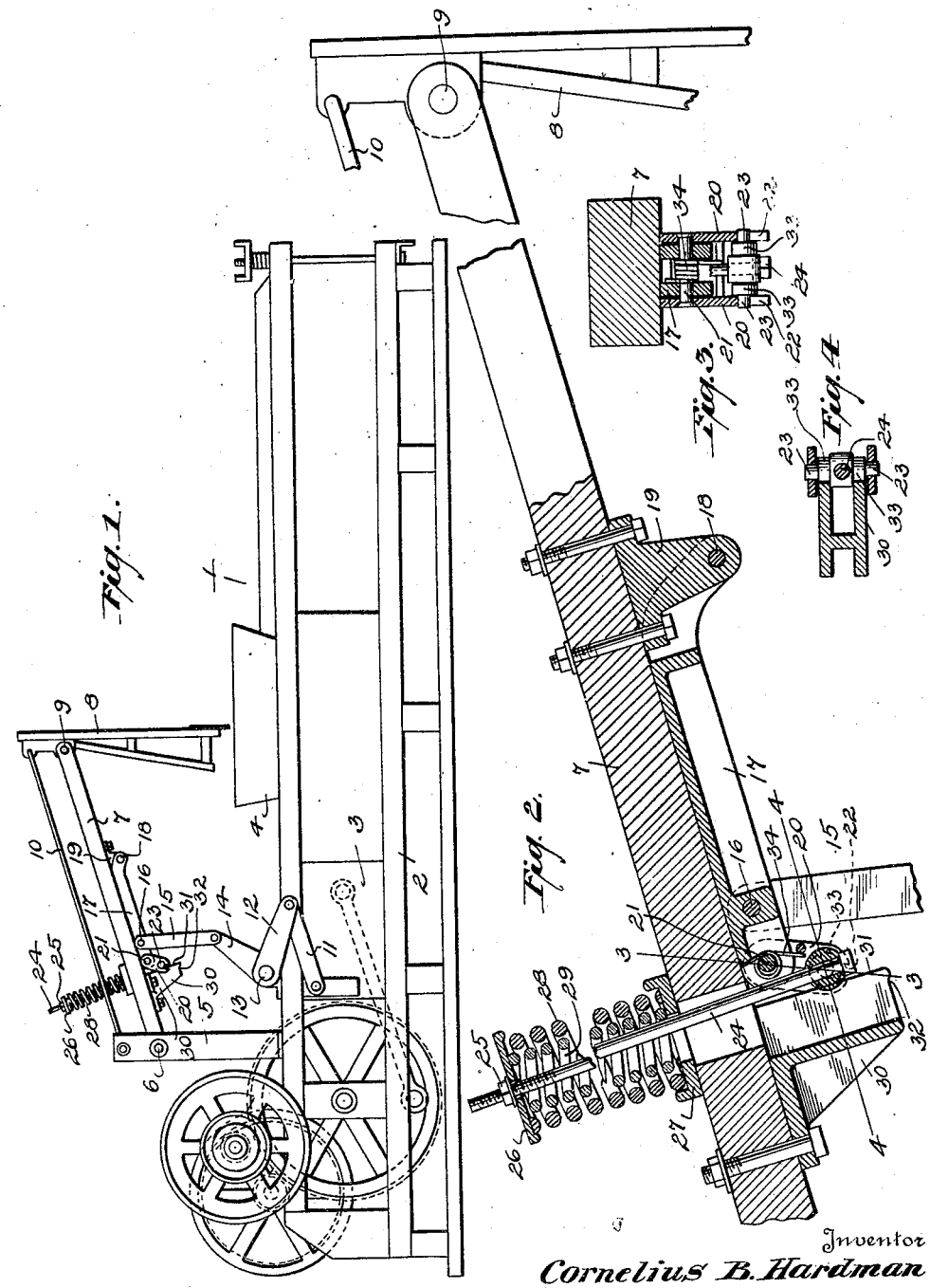
Inventor
Cornelius B. Hardman
By W. J. McDowell.
Attorney Patented July 23, 1929.

UNITED STATES PATENT OFFICE.

1,721,906

CORNELIUS B. HARDMAN, OF COLUMBUS, OHIO.

BALING PRESS.

Application filed April 24, 1926, Serial No. 104,267. Renewed December 13, 1928.

This invention relates to improvements in baling presses of the type employed in compressing loose material such as hay, cardboard, rags and the like and pressing the same into compact bales for convenience in handling and shipping.

Many presses of this type are constructed to include oscillating feeder heads, which are mounted upon the frame of the press and driven in such manner as to force the loose material into the baling chamber of the press, where the material is subjected to pressure by a reciprocating piston or plunger and the completed bales produced. These feeder heads must of necessity be positively driven, and it frequently happens that in their cycle of operation the same engage with obstructions of relatively non-yielding materials with the result that either the feeder head or its gripping elements are broken by the excessive strains hereby placed thereon.

It is an object of the present invention to provide a feeder head with an improved driving mechanism whereby in the event of the feeder head encountering an obstruction a spring relief will be actuated to release the positive drive to the feeder head so as to avoid injury and breakage to the feeder head and its associated parts.

With these and other objects in view as will appear as the description proceeds, the invention consists in the novel features of construction, combinations of elements and arrangements of parts hereinafter to be fully described and pointed out in the appended claims.

In the accompanying drawing:

Figure 1 is a side elevation of a baling press embodying the improved feeder head drive comprising the present invention, Figure 2 is a vertical longitudinal sectional view on an enlarged scale of the feeder head and its associated parts, Figure 3 is a transverse sectional view on the line 3—3 of Figure 2, Figure 4 is a horizontal sectional view on the line 4—4 of Figure 2.

Referring more particularly to the drawings the numeral 1 designates a baling press. In this instance the press is constructed to include a frame 2 which carries a reciprocating plunger 3 which moves beneath a feed opening 4 provided in the top of the baler so as to permit of the insertion of the materials to be baled into the frame and the subsequent advance and application of pressure thereto by the action of the plunger. Arising from the frame is a standard 5 upon which is pivoted as at 6 one end of the swinging beam 7 of a feeder head 8. The head 8 is pivotally connected as at 9 to the outer end of the beam 7, and the upper end of the head 8 is connected by the usual tie rods 10 to the upper end of the standard 5. It will be understood that as the beam 7 oscillates the head 8 will be raised and lowered so that material placed in the feed opening 4 will be fed into the baling chamber of the press for engagement with the plunger.

To drive the feeder head the plunger has connected therewith a bracket 11, which extends to a crank arm 12 fixed to a rock shaft 13 journaled in bearings on the frame 2. The center of the rock shaft is provided with a fixed crank arm 14 to the outer end of which are connected the lower ends of a pair of links 15. The upper ends of these links are pivotally connected to the outer ends of a transverse bolt 16 carried by a swinging guide arm 17. This guide arm is pivoted as at 18 to bearings 19 carried in connection with the underside of the beam 7. The forward end of the guide arm, in advance of the bolt 16 is provided with a pair of links 20, which are pivotally mounted upon a bolt 21 carried by the guide arm. The lower ends of the links 20 are bifurcated or slotted as at 22 for the reception of a transversely extending pin 23 mounted on the lower end of a bolt 24. This bolt passes upwardly through the center of the beam 7 and has its upper end threaded for the reception of a nut 25 which presses upon a washer 26, and between the washer 26 and a seat 27 on the upper side of the beam there is disposed a pair of inner and outer concentrically arranged springs 28 and 29 respectively. It will be seen that the springs normally tend to elevate the bolt 24, and maintain the pin 23 within the slotted openings 22 provided in the links 20. In operation, it will be seen that as the plunger reciprocates an oscillatory motion will be imparted to the rock shaft 13. This results in imparting longitudinal thrusts to the links 15, which in turn are connected with the guide arm 17, and this member in turn is connected with the beam of the feeder head by means of the links 20, which press upon the pins 23 and the bolt 24 so that an oscillating motion will be imparted to the feeder head.

In the event, however, that upon the descent of the feeder head, if the same encounters an obstruction, the movement of the beam 7 will be arrested, however, downward movement of the guide arm may take place relative to the beam, but this movement is accomplished by the placing under compression of the springs 28 and 29. It will be observed that the under side of the beam is provided with a stationary guide block 30, including a vertical face 31 and a notched lower edge 32, and that the face 31 is normally engaged by a pair of rollers 33 mounted for rotation upon the pin 23. Normally, the tension of the spring has been regulated so that the normal resistance encountered by the feeder head is not of sufficient moment to cause such vertical relative movement between the beam 7 and the arm 17 to permit the rollers 33 to leave the vertical face 31 of the block 30. If, however, an extreme condition is encountered and the beam is held substantially stationary, the swinging movement of the guide arm will be such, relative to the beam, as to draw the bolt downwardly, against the resistance of the springs 28 and 29 so that the rollers 33 will leave the face 31 and will be engaged with the notched surfaces provided in the lower edge 32. The bolt 21 is thus disengaged entirely from the guide arm, a feature which is permitted by reason of the open slotted ends 22 of the links 20, and the links 20 themselves, after disengagement with the pin 23 will be swung under the influence of a spring 34 to inactive positions where the same will be out of engagement with the block 30.

It will thus be seen that the driving connection between the feeder head and the guide arm will be entirely disconnected or released, so that the guide arm may continue to reciprocate without imparting its power to the beam.

By this construction a baling press is provided with safety relief means for its pivoted feeder head and the nature of this relief is such as to eliminate the possibility of the feeder head, or any other part of the press being damaged, should an abnormal pressure or any obstruction stop the feeder head anywhere along its path of travel. The relief springs 28 and 29 located on the top of the swinging beam 7 operate normally on the guide arm 17, which is fulcrumed on the under side of the beam and these springs may be adjusted to suit the load required by the feeder head pressure. Ordinary or even excessive feeding pressures against the feeder head, preventing it from going to the bottom or stopping within the bale chamber, are automatically taken care of by the relief means. An extraordinary abnormal pressure caused by an obstruction preventing the feeder head from going to the bottom or even entering the bale chamber will cause the relief springs to exceed their maximum intended compression. When this point is reached the rollers 33 pass around the column of the guide block and enter the notches therein so as to be securely held and locked. This releases the swinging guide arm entirely from connection with the relief springs and permits the feeder head to remain inoperative while the press continues in motion. Should this condition occur, the rollers may be replaced to their original positions in engagement with the side face 31 of the guide block, otherwise the springs will not have the proper pressure against the feeder head in order to feed the material to the bottom of the bale chamber. The restoration of the springs may be accomplished by loosening the nut 25 to release the compression of the springs.

What is claimed is:

1. In a baling press, a pivotally mounted feeder head beam, a guide arm pivoted at one end to said beam, power applying means connected with said arm for oscillating the latter, a bolt carried by said beam, a spring connection between the upper end of said bolt and said beam, rollers carried by the lower end of said bolt, a block carried by said beam and including a substantially vertical face with which said rollers normally engage, and a slotted link connection between the outer end of said arm and said bolt, said link connection serving to withdraw from engagement with said bolt when said beam is subjected to an abnormal resistance.

2. In a baling press, a pivotally mounted feeder head beam, a guide arm pivoted at one end to said beam, power applying means connected with said arms for oscillating the latter, a bolt carried by said beam, a spring connection between the upper end of said bolt and said beam, rollers carried by the lower end of said bolt, a block carried by said beam and including a substantially vertical face and an offset shoulder, said rollers normally engaging said face, and a link connection between the outer end of said arm and said bolt, said link connection permitting the bolt and rollers to swing into engagement with said shoulder when said beam is subjected to an abnormal resistance.

3. In a baling press, a pivotally mounted feeder head beam, a power driven oscillatory crank, a swinging guide arm pivoted to said beam, a link connection between the outer end of said guide arm and said crank, a spring pressed bolt carried by said beam, a transverse pin carried by the lower end of said bolt, a block carried by said beam and including a horizontal and a substantially vertical edge, the latter of which is engaged by said pin, and a slotted link connection between the outer end of said arm and said bolt, said link connection serving to place said transverse pin into engagement with said horizontal edge and withdraw from engagement with said bolt when said beam is subjected to an abnormal resistance.

4. In a baling press, a pivotally mounted feeder head beam, a power driven oscillatory crank, a swinging guide arm pivoted to said beam, a link connection between the guide arm and said crank arm, a spring pressed bolt carried by and extending through said beam, a transverse pin having rollers thereon carried by the lower end of said bolt, a block carried by the under side of said beam and including substantially vertical and horizontal faces having notches formed in the latter of said faces, said rollers normally engaging said vertical faces, a link connection including a pair of plates having their upper ends pivotally connected to the outer end of said guide arm, the lower ends of said plates having open ended slots formed therein and engaging with the ends of said transverse pin, said link connection serving to place said rollers within the notches of said block and to withdraw from engagement with said bolt when said beam is subjected to an abnormal resistance.

In testimony whereof I affix my signature.

CORNELIUS B. HARDMAN.